March 1, 1960  L. J. LOCKWOOD  2,926,563
CLIP-ON GLASSES
Filed Oct. 14, 1957

INVENTOR.
Lee John Lockwood.
BY
ATTORNEY.

United States Patent Office 2,926,563
Patented Mar. 1, 1960

2,926,563

CLIP-ON GLASSES

Lee John Lockwood, Wonewoc, Wis., assignor, by mesne assignments, to The Electric Storage Battery Company, Philadelphia, Pa., a corporation of New Jersey Application October 14, 1957, Serial No. 690,130

1 Claim. (Cl. 88—41)

This invention relates generally to ophthalmic mountings and, more particularly, to clip-on sunglasses adapted to be worn over ordinary prescription glasses to minimize glare.

An outstanding disadvantage of the conventional type of clip-on sunglasses, comprising lens rims joined by a resilient strip of spring metal, which forms the bridge, is that as the result of frequent flexing of the bridge for mounting, it will eventually bend to a new normal position with the lenses further spread apart, therefore will not be securely held in place on the lens rims; furthermore, if the spring is too strong or is bent to bring the lenses closer together, the abnormal tension will tend to twist the frames of the prescription glasses out of shape and necessitate adjustment. Also the vertical axes of the sunglass lenses are not held in truly vertical positions when mounted but are somewhat inclined, which is undesirable in polarized types of sunglass lenses.

A further disadvantage of conventional clip-on sunglasses is that both hands must be used for grasping and spreading the lenses apart, when mounting, therefore making it difficult for the driver of a vehicle, for example, to mount such sunglasses while driving.

An object of my invention is to provide a novel clip-on sunglass mounting which will overcome the above named disadvantages, which is highly reliable in operation throughout long periods of use, and which will maintain a substantially uniform and not abnormal spring pressure for clipping and securely maintaining the sunglasses in place.

Another object of the invention is to provide clip-on sunglasses in which the vertical axes of the sunglass lenses are held in exact parallel position when spread apart and clipped onto ordinary glasses or spectacles, without the necessity of bending any parts of the frame out of shape.

Another object of the invention is to provide clip-on sunglass construction which enables the driver of an automobile to both grasp and mount the sunglasses with one hand, while controlling the steering wheel with the other.

A still further object of my invention is to provide clip-on sunglasses of relatively simple and inexpensive construction and which is attractive in appearance.

Figure 1:
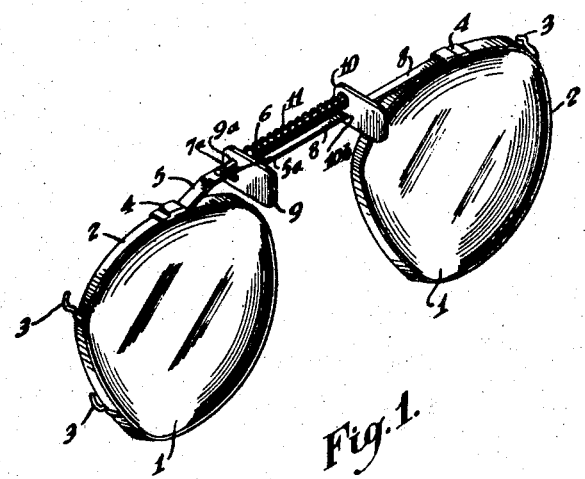
Figure 2:
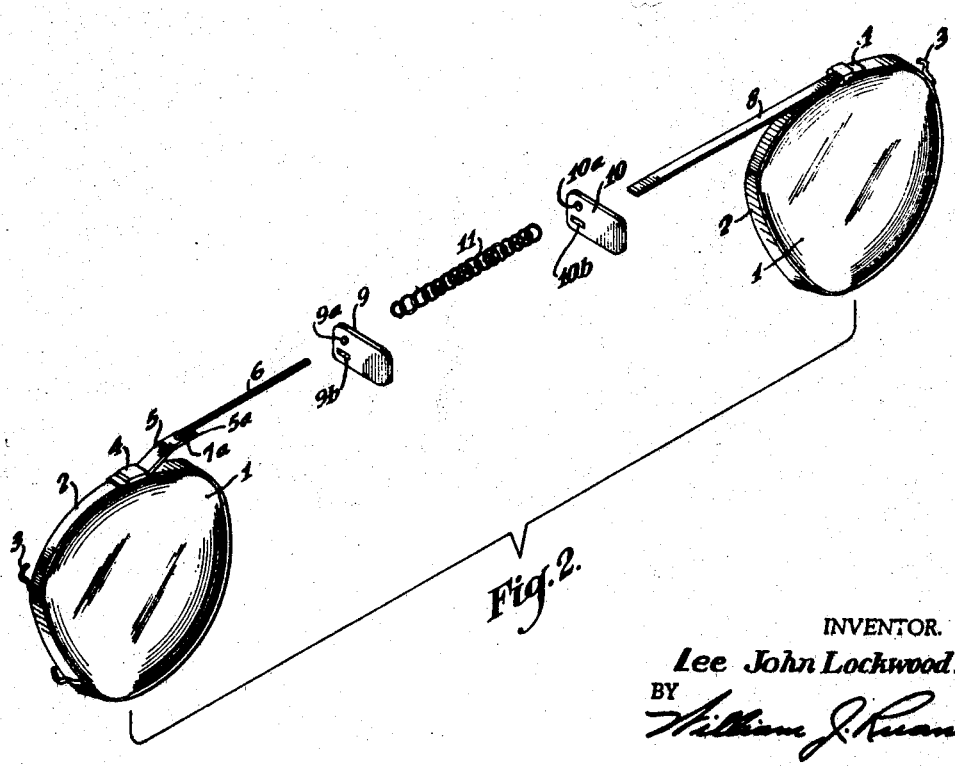

Other objects and advantages of my invention will become more apparent from a study of the following description taken with the accompanying drawing wherein:

Figure 1 is a perspective view of a pair of clip-on sunglasses embodying the principles of the present invention, and Figure 2 is a perspective, exploded view of the sunglasses shown in Fig. 1, wherein the parts are shown separately to more clearly show their construction.

Referring more particularly to the drawing, numerals 1, 1 denote a pair of clip-on sunglass lenses surrounded by rims 2, 2 of metal or plastic material having integrally secured to the sides of the rims, clips 3, which are adapted to be clipped onto the outer sides of the rims of a pair of ordinary prescription glasses (not shown). By means of lugs 4, soldered or otherwise integrally secured to the tops of the rims 2, the outer ends of metal strips 5 and 8 are rigidly held on the rims. A piece of stiff wire 6 is soldered at 7a, at one end, to the end of strip 5. Wire 6 passes through a hole 9a of corresponding shape in lug 9. The free end of wire 6 is soldered to portion 10a of 10. Similarly strip 8 passes through a hole 10b of corresponding shape in lug 10 and its terminal is soldered or otherwise integrally secured at 9b to lug 9. Thus, wire 6 and strip 8 are disposed in horizontal, parallel relationship and, together with lugs 9 and 10, serve as guides for guiding movements of the lens rims, either together or apart. Lugs 9 and 10 are disposed at right angles to wire 6 and strip 8 and may be grasped by the thumb and forefinger of one hand.

A helical spring 11 is wound around wire 6 and its ends engage against the confronting surfaces of lugs 9 and 10, thereby normally spreading the lugs apart and moving the rims 2 toward each other. Such outward spreading apart of the lugs by spring 11 is limited by limit stop 5a formed at the free end of strip 5 which abuts and limits outward movement of lug 9.

In operation, assume that the clip-on sunglasses are in the normal position, as shown in Fig. 1, and that it is desired to mount them on ordinary glasses or spectacles. By grasping lug 9 with the thumb and lug 10 with the forefinger, the sunglasses may be held with one hand and placed over prescription glasses being worn. Then by pressing lugs 9 and 10 together and thus compressing spring 11 which resists this movement, strips 5 and 8 are relatively moved along parallel paths away from each other so that the lenses 1 and 2 will be spread apart while their vertical axes are still maintained in parallel relationship.

When the lenses are spread apart sufficiently so that clips 3 easily clear the sides of the prescription glass rims, lugs 9 and 10 are released, whereupon spring 11 spreads lugs 9 and 10 apart, thereby pulling strip 8 and wire 6 inwardly, toward each other, along parallel paths and, moving clips 3 inwardly onto the sides of the prescription glass rims, thereby clipping the sunglasses securely thereon. If polarized sunglasses lenses are used, their vertical axes will be maintained in parallel relationship at all times. It will be further noted that a relatively weak helical spring 11 is sufficient to keep the sunglasses securely clipped on, also the clip-on sunglasses are suitable for mounting on a wide variety of types and styles of spectacles.

Thus it will be seen that I have provided an efficient pair of clip-on sunglasses which can be grasped and mounted on ordinary prescription glasses by the use of only two fingers of one hand, thereby allowing free use of the other hand, which is particularly advantageous when driving a vehicle; furthermore, I have provided clip-on sunglasses requiring no bending of the bridge out of shape for mounting thereof and in which the lenses are accurately guided when spread apart or moved together by guiding means which will insure maintenance of the vertical axes of the lenses in parallel relationship at all times and will permit spreading apart of the lenses to a greater extent than heretofore possible; furthermore I have provided clip-on sunglasses having long life and involving relatively few and simple parts which are cheap to manufacture and are adaptable for mass production.

While I have illustrated and described a single specific embodiment of my invention, it will be understood that this is by way of illustration only, and that various changes and modifications may be made within the con-

I claim:

A pair of clip-on sunglasses comprising a pair of sunglass lenses, each having a lens rim, clips fastened to the outer sides of said rims, a pair of strips, each having one end secured to the top of one of said rims, a flat lug fastened at the end of each of said strips and extending forwardly at right angles thereto so as to serve as a finger piece, each lug having a hole through which the other of said strips extends, having a cross-section substantially corresponding to that of the other of said strips, and a spring surrounding one of said strips and extending between said lugs for normally biasing the lugs apart and biasing the rims together, whereby said lugs may be grasped by the thumb and forefinger of one hand squeezed together to compress said spring and spread said rims apart.

References Cited in the file of this patent

UNITED STATES PATENTS

| | | |
|---|---|---|
| 553,975 | De Celles | Feb. 4, 1896 |
| 597,941 | Blanchard | Jan. 25, 1898 |
| 2,206,880 | Cozzens | July 9, 1940 |

FOREIGN PATENTS

| | | |
|---|---|---|
| 10,857 | Germany | Sept. 13, 1880 |
| 8,953 | Great Britain | of 1885 |
| 5,187 | Great Britain | of 1914 |